US009819995B2

(12) United States Patent
Park et al.

(10) Patent No.: US 9,819,995 B2
(45) Date of Patent: Nov. 14, 2017

(54) DEVICE AND METHOD FOR DATA TRANSMISSION AND RECEPTION USING HDMI

(71) Applicant: LG ELECTRONICS INC., Seoul (KR)

(72) Inventors: Jangwoong Park, Seoul (KR); Hyeonjae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/128,902

(22) PCT Filed: Mar. 24, 2015

(86) PCT No.: PCT/KR2015/002849
§ 371 (c)(1),
(2) Date: Sep. 23, 2016

(87) PCT Pub. No.: WO2015/147512
PCT Pub. Date: Oct. 1, 2015

(65) Prior Publication Data
US 2017/0238051 A1    Aug. 17, 2017

Related U.S. Application Data

(60) Provisional application No. 61/969,264, filed on Mar. 24, 2014.

(51) Int. Cl.
*H04N 5/63* (2006.01)
*H04N 5/38* (2006.01)
(Continued)

(52) U.S. Cl.
CPC ....... *H04N 21/43635* (2013.01); *G09G 5/006* (2013.01); *H04L 12/10* (2013.01);
(Continued)

(58) Field of Classification Search
CPC .. H04N 5/63; H04N 5/44; H04N 5/38; H04N 21/43635; H04N 21/443; H04N 21/439;
(Continued)

(56) References Cited

U.S. PATENT DOCUMENTS

2012/0080954 A1    4/2012  Gachon et al.
2016/0345055 A1*  11/2016  Kim ................ H04N 21/43635
2017/0006336 A1*   1/2017  Lee ................ H04N 21/43635

FOREIGN PATENT DOCUMENTS

KR    1020100104025    9/2010
KR    1020100114034    10/2010
(Continued)

OTHER PUBLICATIONS

PCT International Application No. PCT/KR2015/002849, International Search Report dated May 29, 2015, 2 pages.

*Primary Examiner* — Sherrie Hsia
(74) *Attorney, Agent, or Firm* — Lee, Hong, Degerman, Kang & Waimey PC

(57) ABSTRACT

A method for transmitting and receiving data of a source device using HDMI (High Definition Media Interface) is disclosed. A method for transmitting and receiving data of a source device using HDMI according to the present invention comprises requesting for reading out EDID (Extended Display Identification Data) to a sink device when the sink device is connected; receiving from the sink device EDID including power delivery support information of the sink device; transmitting required power characteristic information of the source device; and receiving power according to the required power characteristic information.

16 Claims, 17 Drawing Sheets

(51) Int. Cl.
*H04N 5/44* (2011.01)
*H04N 21/4363* (2011.01)
*G09G 5/00* (2006.01)
*H04L 12/10* (2006.01)

(52) U.S. Cl.
CPC . *G09G 2330/021* (2013.01); *G09G 2370/042* (2013.01); *G09G 2370/12* (2013.01)

(58) Field of Classification Search
CPC ............ G09G 5/006; G09G 2330/021; G09G 2370/042; G09G 2370/12; H04L 12/10
USPC ........ 348/730, 725, 723; 725/67, 68, 85, 98, 725/100, 118, 131, 139, 148, 151
See application file for complete search history.

(56) References Cited

FOREIGN PATENT DOCUMENTS

| | | |
|---|---|---|
| KR | 101144693 | 5/2012 |
| KR | 1020140004158 | 1/2014 |

\* cited by examiner

【Fig. 1】
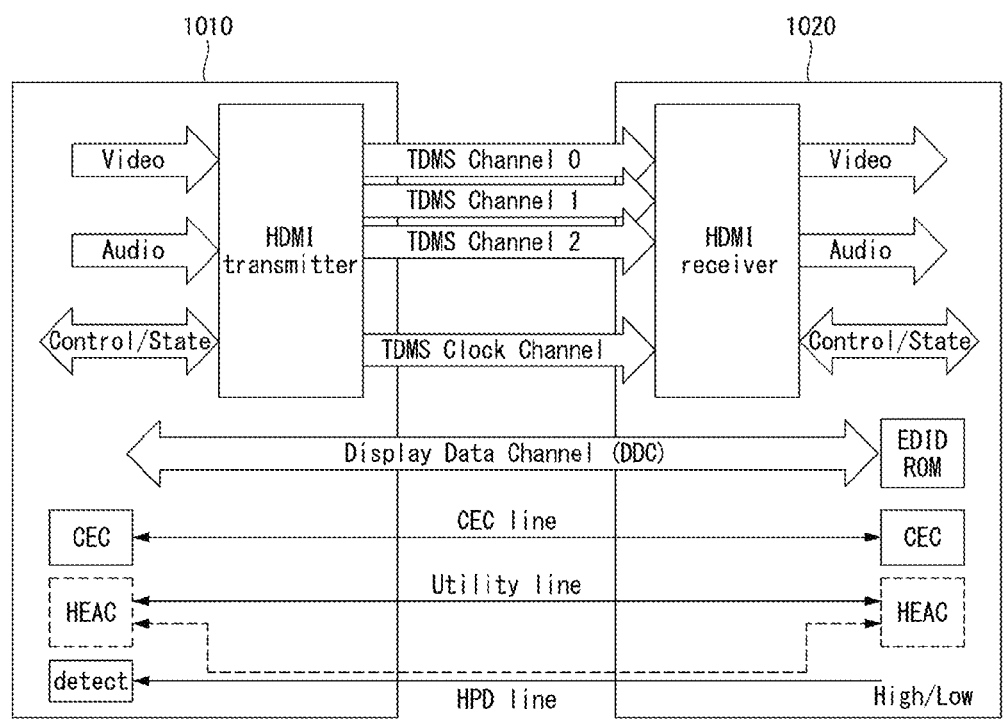

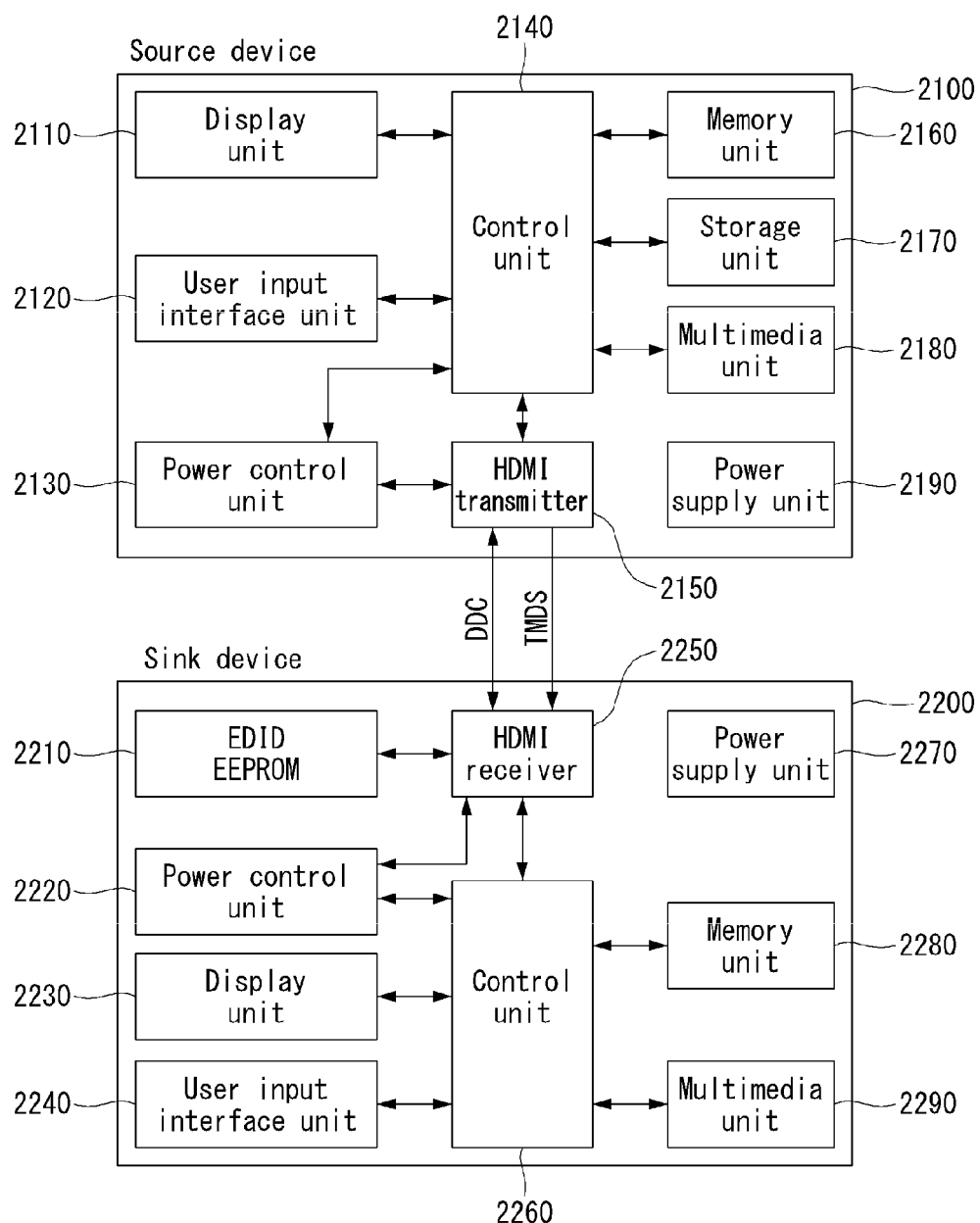
[Fig. 2]

【Fig. 3】

| Address | No. Bytes | Description |
|---|---|---|
| 00h ~ 07h | 8 | Header information.<br>Fixed to 00 FF FF FF FF FF FF 00. |
| 08h ~ 11h | 10 | Vendor/Product identification. Manufacturer, Product code, Serial number, and Date of Manufacture |
| 12h ~ 13h | 2 | EDID structure version/revision |
| 14h ~ 18h | 5 | Basic Display Parameters/Features. Video input definition (analog or digital), Max. Horizontal Image Size, Max. Vertical Image Size, Display Transfer Characteristic(Gamma), Feature Support(Standby, Suspend, Display Type, Standard Default Color space (sRGB), Preferred Timing Mode support and so on) |
| 19h ~ 22h | 10 | Color Characteristics. Information related to color and white point. Express in terms of xy-coordinaes of red, green, blue, and white in the color space. |
| 23h ~ 25h | 3 | Established Timings.<br>Describes commonly used timing mode |
| 26h ~ 35h | 16 | Standard Timings. Describes 8 standard timing descriptors, and one descriptor includes information about range of horizontal active pixel, image aspect ratio, and refresh rate (60 ~ 123 Hz). Timing not belonging to the established timing is described accoridng to the VESA DMT standard or usesthe timing informaiton calculated by using GTF. |
| 36h ~ 7Dh | 72 | Detailed Timing Descriptors. Describes detailed timing information about display resolution, and four descriptors are used. The first descriptor describes preferred detailed timing, the second descriptor describes secondary detailed timing or monitor additional information (serial number, range limites, and name). The remaining two descriptors include monitor additional information. Monitor range limit and name must be described. |
| 7Eh | 1 | Extension Flag. Specifies the number of additional EDID extensin blocks. |
| 7Fh | 1 | Checksum. |

[Fig. 4]

| Byte # | |
|---|---|
| 0 | Tag. 0x02 |
| 1 | Revision Number. 0x03 |
| 2 | Byte number offset d value at which Detailed Timing Descriptor (DTD) of 18 bytes starts |
| 3 | Indication of underscan, audio support, YCBCR 4:4:4 or YCBCR 4:2:2 support, the number of native DTDs supported. |
| 4 | Start of data block collection |
| d-1 | End of data block collection |
| d | Start of 18-byte DTD. Follows the EDID DTD format |
| d+(18*n)-1 | End of 18-byte DTD. n is the number of descriptors included |
| d+(18*n) | Beginning of Padding. 0x00 |
| 126 | End of Padding. 0x00 |
| 127 | Checksum. |

【Fig. 5】

(a) Video Data Block

| Byte # | Bits 5-7 | Bits 0-4 |
|---|---|---|
| 0 | Video Tag Code | The total number of bytes for Short Video Descriptor (L1) |
| 1 | CEA Short Video Descriptor 1 | |
| L1 | CEA Short Video Descriptor L1 | |

(b) Audio Data Block

| Byte # | Bits 5-7 | Bits 0-4 |
|---|---|---|
| 0 | Audio Tag Code | The total number of bytes for Short Audio Descriptor (L2) |
| 1~3 | CEA Short Audio Descriptor 1 | |
| 4~3*L2 | CEA Short Video Descriptor L2/3 | |

(c) Speaker Allocation Data Block

| Byte # | Bits 5-7 | Bits 0-4 |
|---|---|---|
| 0 | Speaker allocation Tag Code | The total number of bytes for Speaker Allocation (L3 = 3) |
| 1~3 | Speaker Allocation Data Block Payload | |

[Fig. 6]

| Byte / Bits # | 7 | 6 | 5 | 4 | 3 | 2 | 1 | 0 |
|---|---|---|---|---|---|---|---|---|
| 0 | Vendor Specific Tag Code (=3) | | | Length(=N) | | | | |
| 1 | IEEE OUI, Third Octet (0xD8) | | | | | | | |
| 2 | IEEE OUI, Second Octet (0x5D) | | | | | | | |
| 3 | IEEE OUI, First Octet (0xC4) | | | | | | | |
| 4 | Version (=1) | | | | | | | |
| 5 | Max_TMDS_Character_Rate | | | | | | | |
| 6 | SCDC_Present | RR_Capable | Rsvd(0) | Rsvd(0) | LTE_340Mcsc_scramble | Indpendent_view | Dual_View | 3D_OSD_Disparity |
| 7 | Rsvd(0) | Rsvd(0) | Rsvd(0) | Rsvd(0) | Rsvd(0) | DC_48bit_420 | DC_36bit_420 | DC_30bit_420 |
| ...N | Reserved (0) | | | | | | | |

[Fig. 7]

(a) HF_VSIF packet header

| Byte/Bits # | 7 | 6 | 5 | 4 | 3 | 2 | 1 | 0 |
|---|---|---|---|---|---|---|---|---|
| 0 | Packet Type = 0x81 | | | | | | | |
| 1 | Version = 0x01 | | | | | | | |
| 2 | 0 | 0 | 0 | Length = Nv | | | | |

(b) HF_VSIF packet contents

| Packet Byte # | 7 | 6 | 5 | 4 | 3 | 2 | 1 | 0 |
|---|---|---|---|---|---|---|---|---|
| PB0 | Checksum | | | | | | | |
| PB1 | IEEE OUI, Third Octet (0xD8) | | | | | | | |
| PB2 | IEEE OUI, Second Octet (0x5D) | | | | | | | |
| PB3 | IEEE OUI, First Octet (0xC4) | | | | | | | |
| PB4 | Version(=1) | | | | | | | |
| PB5 | Rsvd(0) | Rsvd(0) | Rsvd(0) | Rsvd(0) | Rsvd(0) | Rsvd(0) | Rsvd(0) | 3D_Valid |
| (PB6)* | 3D_F_Structure | | | | 3D_Additional_Info_Present | 3D_Disparity_Data_Present | 3D_Meta_present | Rsvd(0) |
| (PB7)* | 3D_F_Ext_Data | | | | Rsvd(0) | | | |
| (PB8)* | Rsvd(0) | Rsvd(0) | Rsvd(0) | 3D_Dual_view | 3D_ViewDependency | | 3D_Preferred2DView | |
| (PB9)* | 3D_DisparityData_Version | | | 3D_DisparityData_length(J) | | | | |
| (PB9+1)* | 3D_DisparityData_1 | | | | | | | |
| ... | ... | | | | | | | |
| (PB9+J)* | 3D_DisparityData_J | | | | | | | |
| (PBm)* | 3D_MetaData_type | | | 3D_MetaData_length(K) | | | | |
| (PBm+1)* | 3D_Metadata_1 | | | | | | | |
| ... | ... | | | | | | | |
| PBm+K)* | 3D_Metadata_K | | | | | | | |
| ...PB(Nv) | Rsvd(0) | Rsvd(0) | Rsvd(0) | Rsvd(0) | Rsvd(0) | Rsvd(0) | Rsvd(0) | Rsvd(0) |

【Fig. 8】

| Offset | R/W | Name |
|---|---|---|
| 0x01 | R | Sink Version |
| 0x02 | R/W | Source Version |
| 0x10 | R/W | Update_0 |
| 0x11 | R/W | Update_1 |
| 0x12-0x1F | R | Reserved for Update Related Uses |
| 0x20 | R/W | TMDS_Config |
| 0x21 | R | Scrambler_Status |
| 0x30 | R/W | Config_0 |
| 0x31-0x3F | R | Reserved for Configuration |
| 0x40 | R | Status_Flag_0 |
| 0x41 | R | Status_Flag_1 |
| 0x42-0x4F | R | Reserved for Status Related Uses |
| 0x50 | R | Err_Det_0_L |
| 0x51 | R | Err_Det_0_H |
| 0x52 | R | Err_Det_1_L |
| 0x53 | R | Err_Det_1_H |
| 0x54 | R | Err_Det_2_L |
| 0x55 | R | Err_Det_2_H |
| 0x56 | R | Err_Det_Checksum |
| 0xC0 | R/W | Test_Config_0 |
| 0xC1`0xCF | R | Reserved for test features |
| 0xD0 | R | Manufacturer IEEE OUI, Third Octet |
| 0xD1 | R | Manufacturer IEEE OUI, Second Octet |
| 0xD2 | R | Manufacturer IEEE OUI, First Octet |
| 0xD3-0xDD | R | Device ID |
| 0xDE-0xFF | R/W | Manufacturer Specific |
| All Remaining Offsets | R | Reserved |

[Fig. 9]
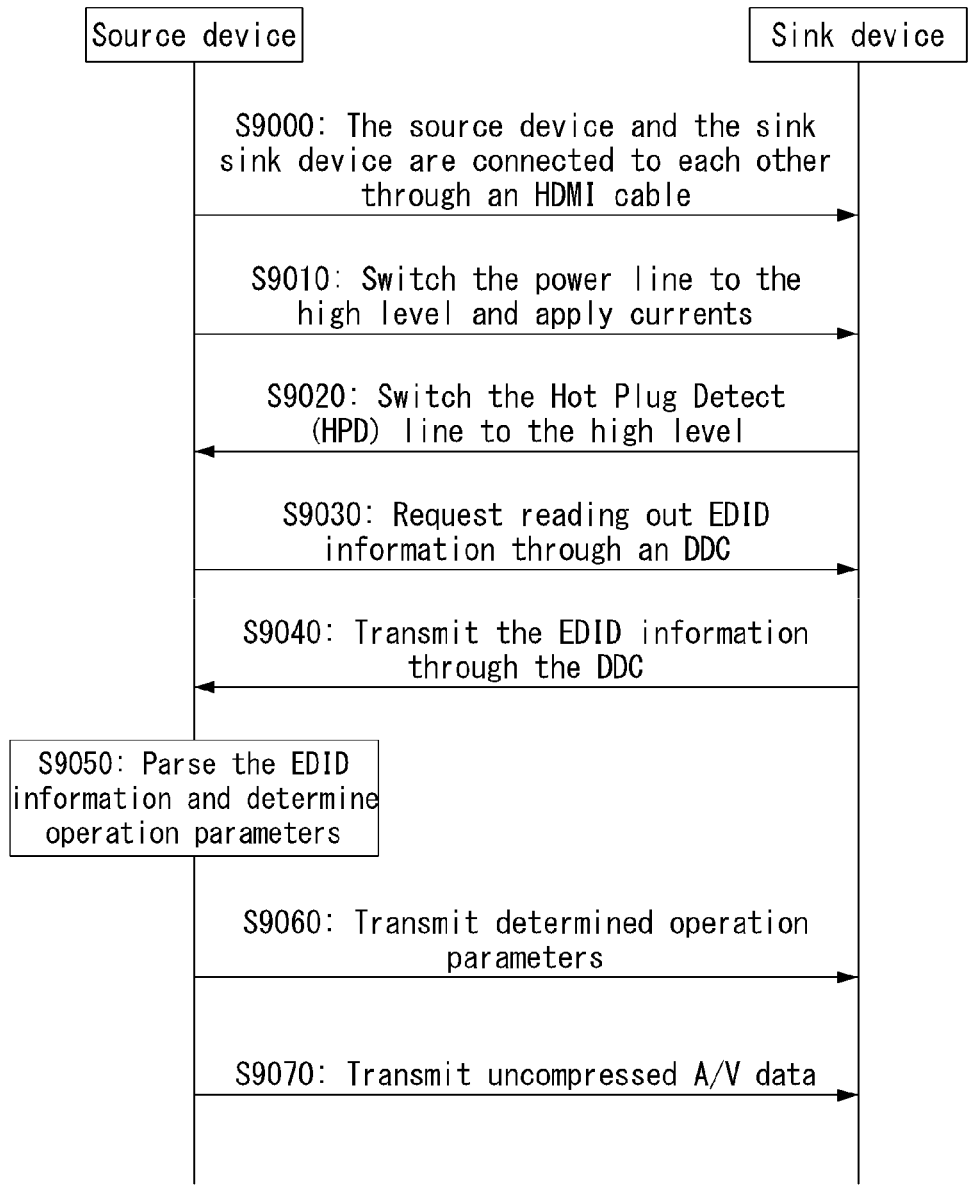

[Fig. 10]
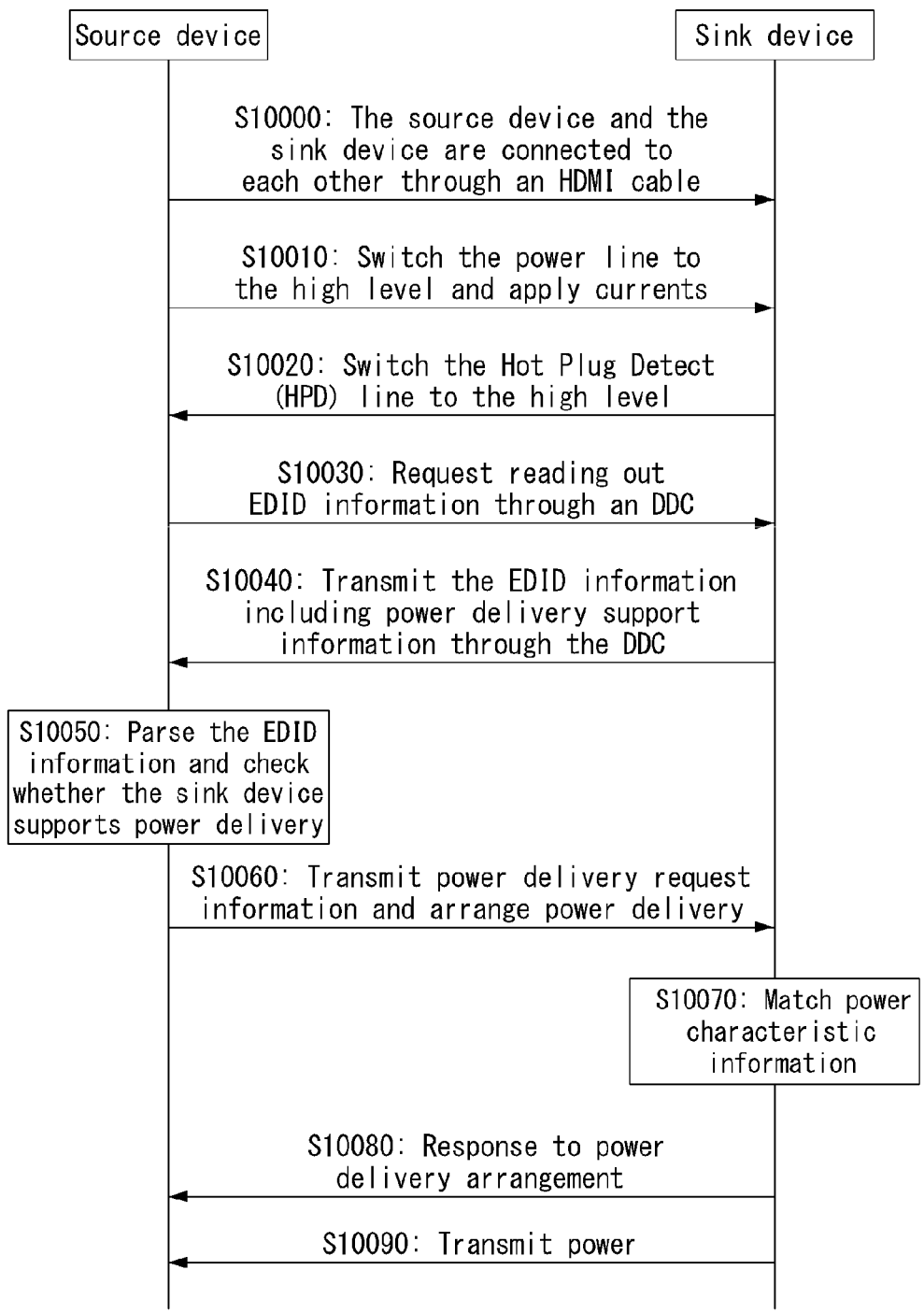

[Fig. 11]
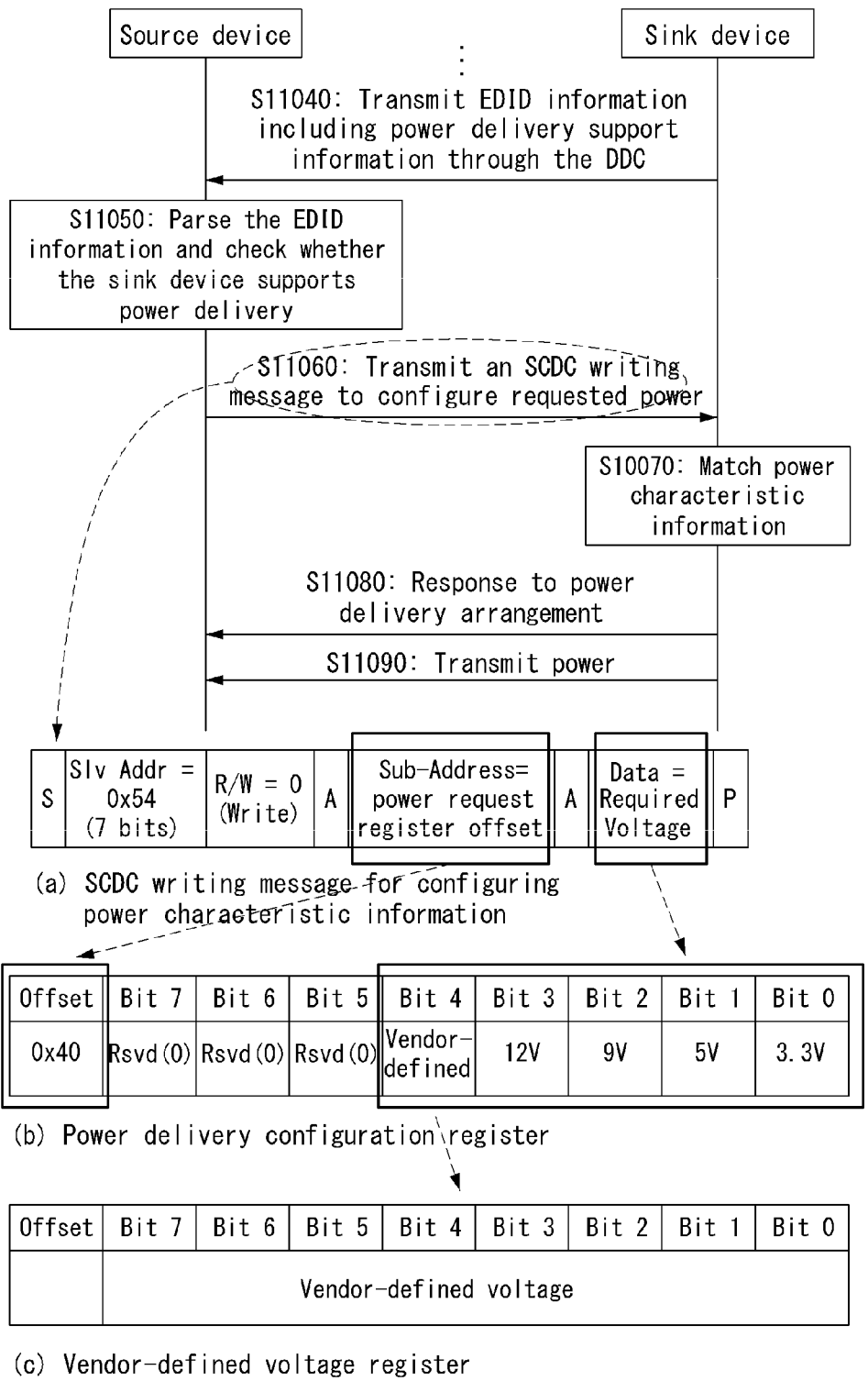

[Fig. 12]
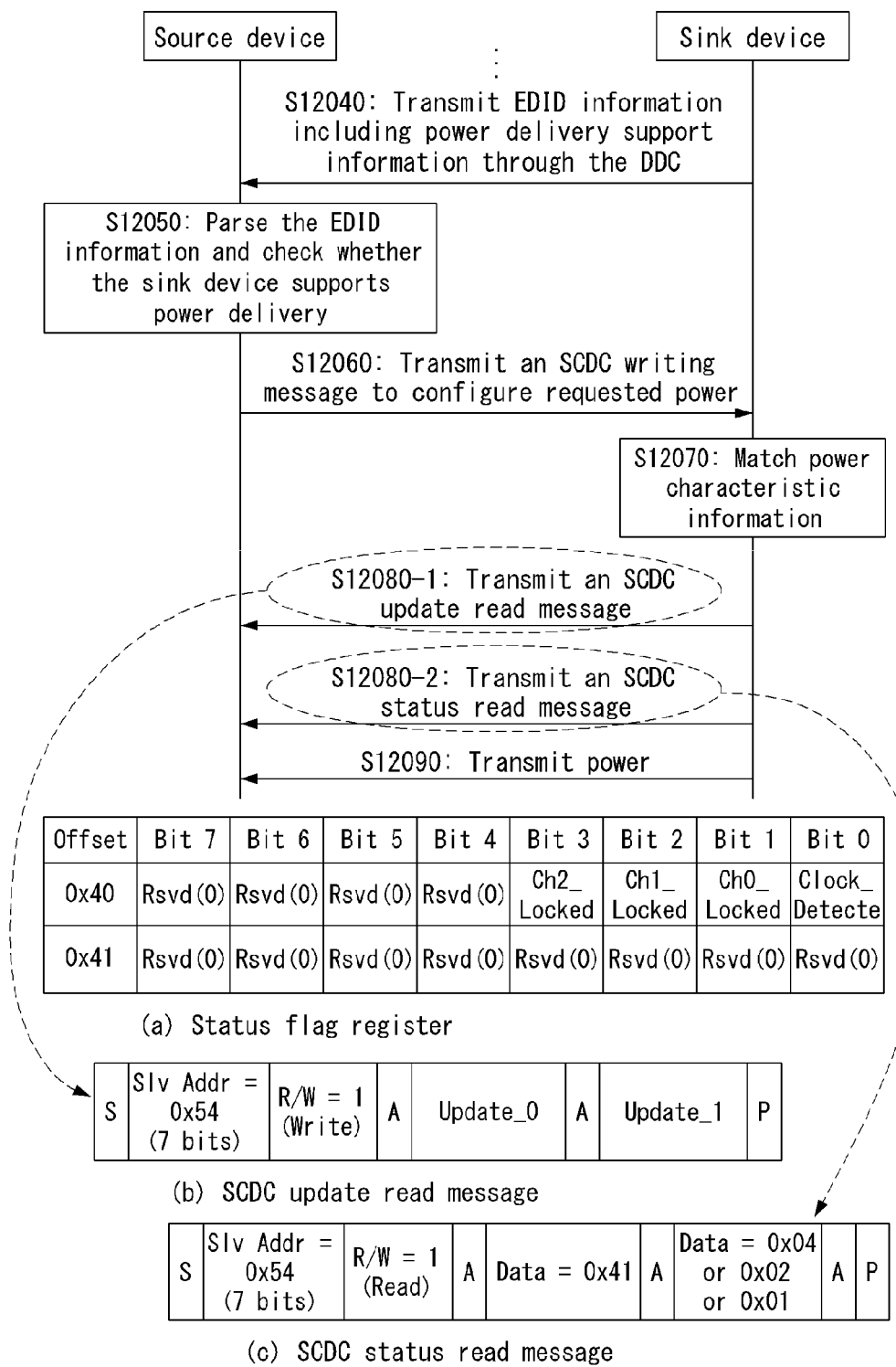

[Fig. 13]
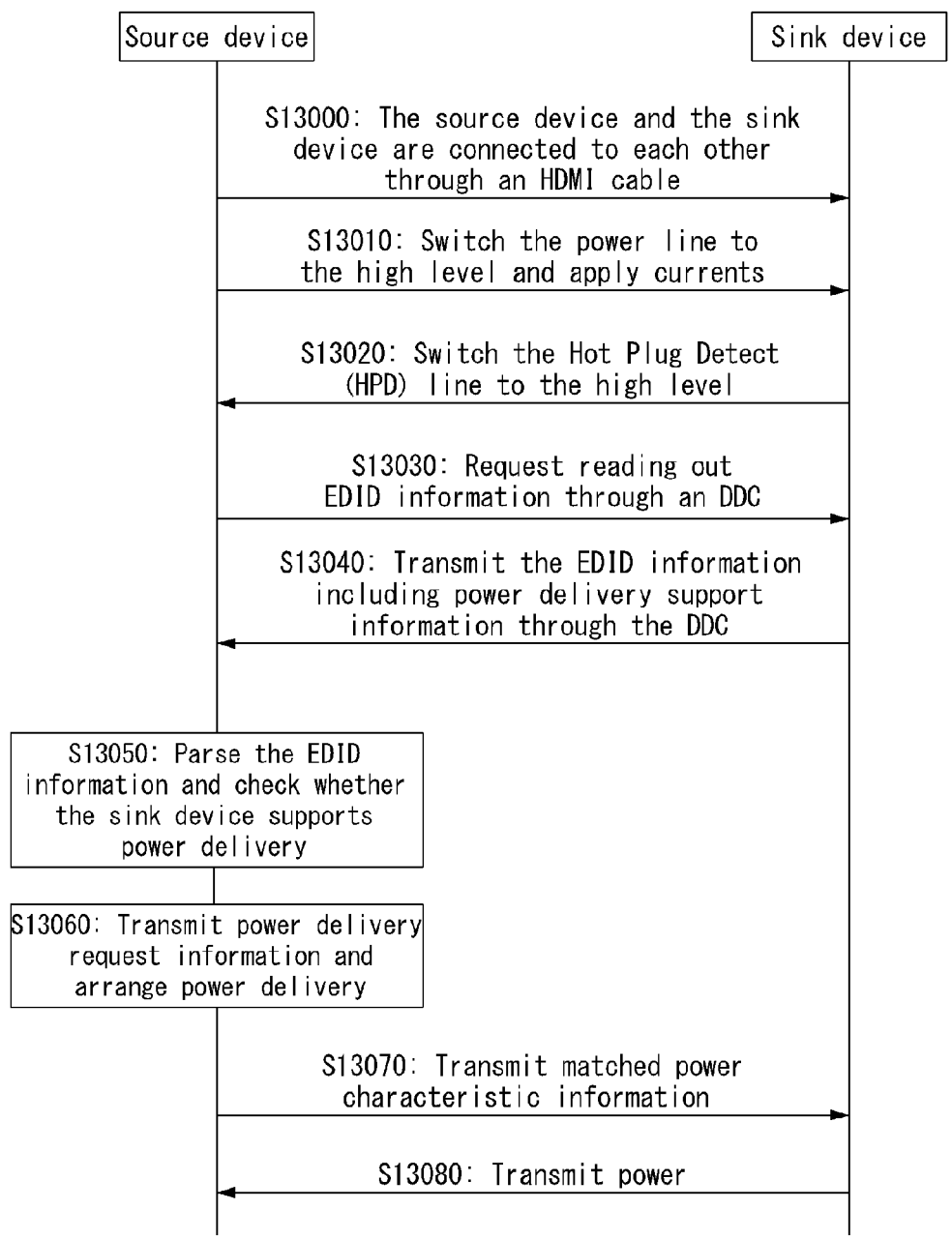

【Fig. 14】
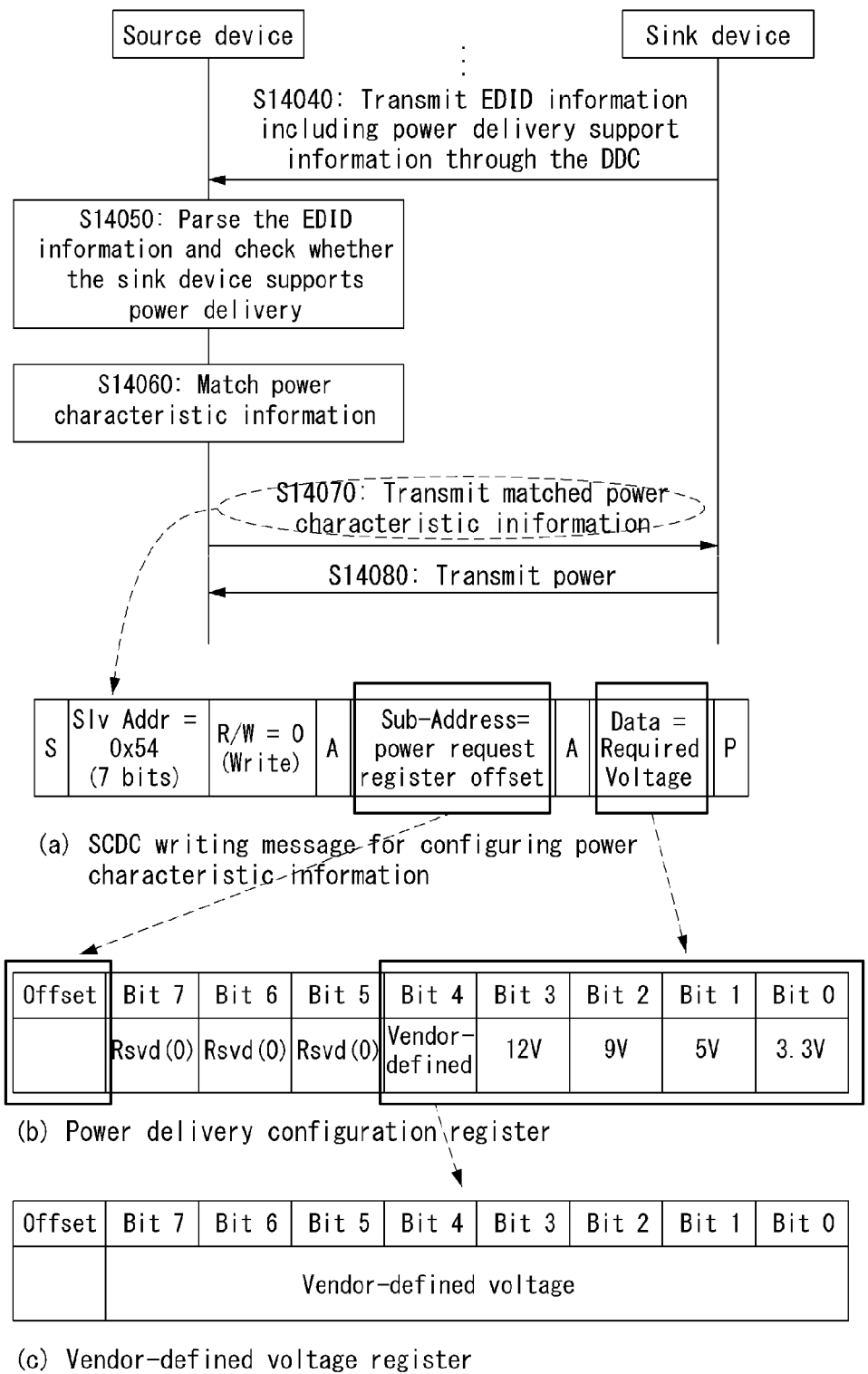

[Fig. 15]
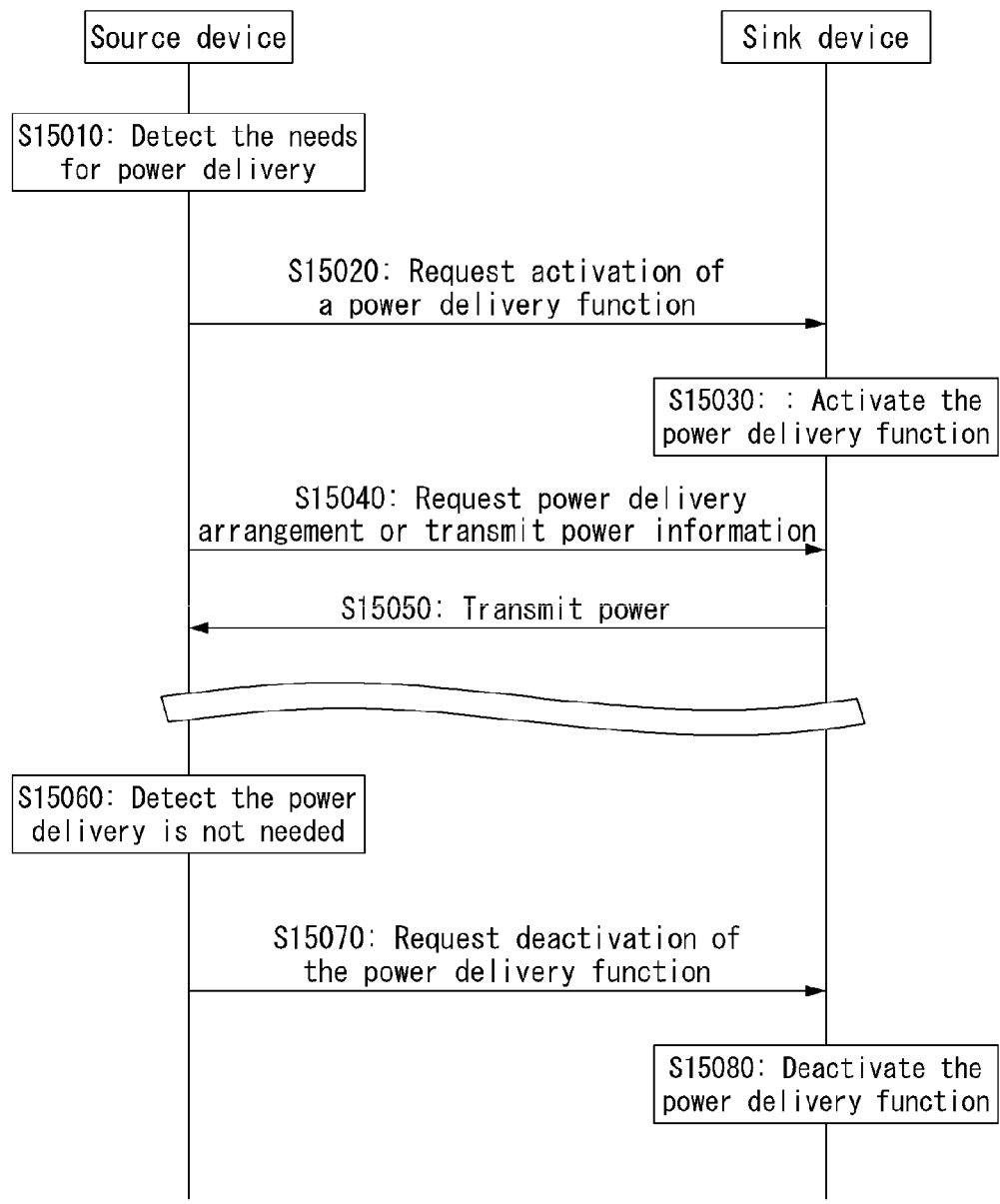

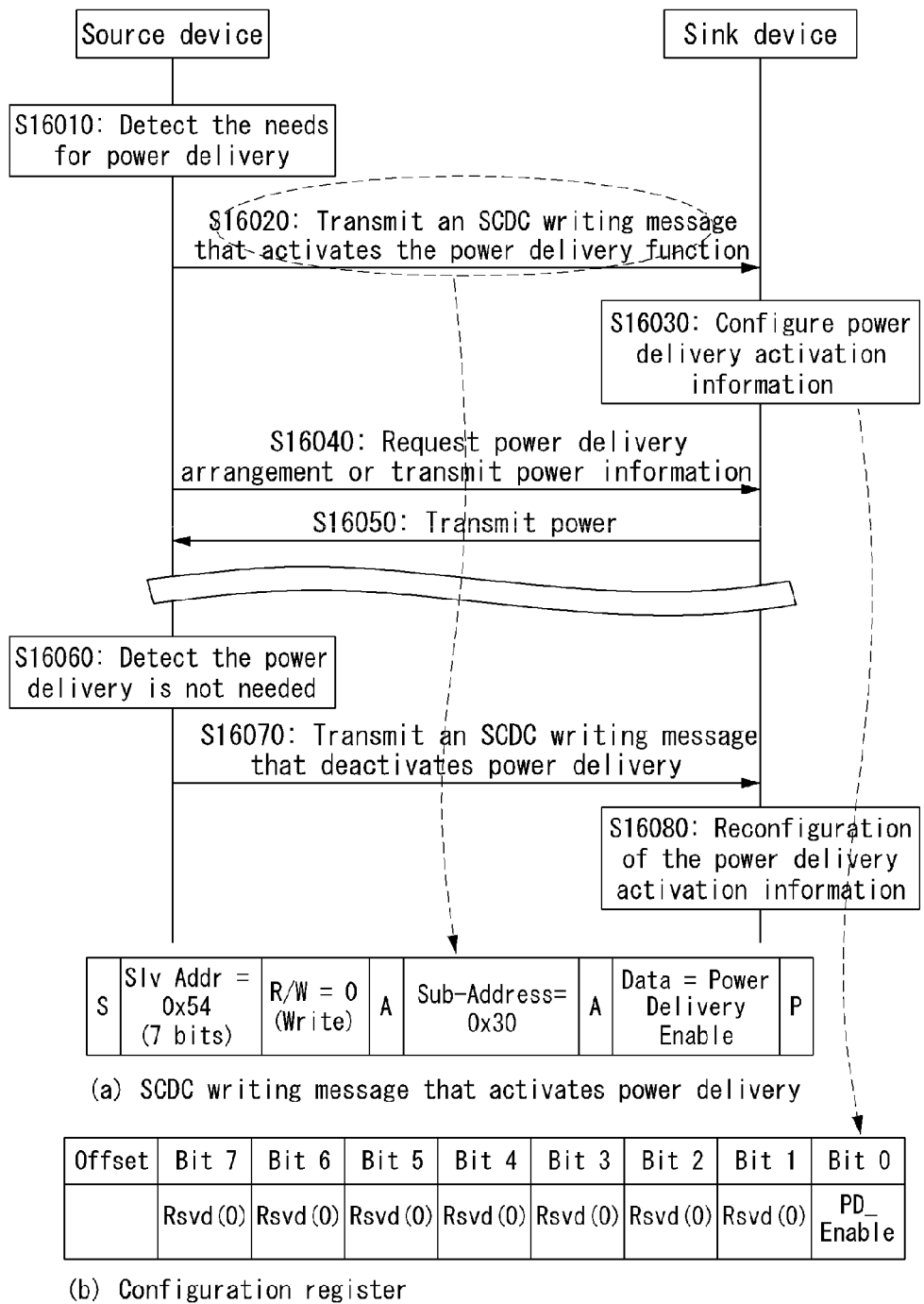

[Fig. 17]

| Byte / Bits # | 7 | 6 | 5 | 4 | 3 | 2 | 1 | |
|---|---|---|---|---|---|---|---|---|
| 0 | Vendor Specific Tag Code (=3) | | | Length(=N) | | | | |
| 1 | IEEE OUI, Third Octet (0xD8) | | | | | | | |
| 2 | IEEE OUI, Second Octet (0x5D) | | | | | | | |
| 3 | IEEE OUI, FirstOctet (0xC4) | | | | | | | |
| 4 | Version (=2) | | | | | | | |
| 5 | Max_TMDS_Character_Rate | | | | | | | |
| 6 | SCDC_Present | RR_Capable | Rsvd(0) | Rsvd(0) | c_scramLTE_340Mcsble | Indpendent_view | Dual_View | 3D_OSD_Disparity |
| 7 | Rsvd(0) | Rsvd(0) | Rsvd(0) | Rsvd(0) | Rsvd(0) | DC_48bit_420 | DC_36bit_420 | DC_30bit_420 |
| 8 | Rsvd(0) | Rsvd(0) | Rsvd(0) | Vendor-defined | PWR_12V | PWR_9V | PWR_5V | PWR_3.3V |
| 9 | PWR_Vendor_Defined | | | | | | | |
| ...N | Reserved (0) | | | | | | | |

DEVICE AND METHOD FOR DATA TRANSMISSION AND RECEPTION USING HDMI

CROSS-REFERENCE TO RELATED APPLICATIONS

This application is the National Stage filing under 35 U.S.C. 371 of International Application No. PCT/KR2015/002849, filed on Mar. 24, 2015, which claims the benefit of U.S. provisional application Ser. No. 61/969,264, filed on Mar. 24, 2014, the contents of which are all hereby incorporated by reference herein in their entirety.

TECHNICAL FIELD

The present invention is related to a device and a method for transmitting and receiving data using HDMI (High Definition Multimedia Interface) and more specifically, a device and a method for transmitting and receiving data using HDMI, capable of charging and driving a source device by supplying power through HDMI.

BACKGROUND ART

HDMI is an interface/standard that develops a Digital Visual Interface (DVI) which is an interface standard of personal computers and displays for a use of AV electronic products. Since the HDMI transmits video/audio from a player to a display device without compressing it, there is very little latency between a source device and a sink device. And the HDMI has high format compatibility since the HDMI does not require separate decoder chip or software. In addition, the HDMI is available to make wirings between AV devices be simplified, which were complicated because video signals, audio signals and control signals are transmitted on only one cable, and the HDMI provides a High-bandwidth Digital Content Protection (HDCP) technique, thereby providing the copyright protection function.

INVENTION CONTENT

Technical Problem

A high speed, wired interface such as HDMI of today is used mostly for transmitting uncompressed video data. As portable devices such as low power smartphones, tablets, and ultra notebooks are widely used, and users frequently want to watch high definition video being played therein through a device equipped with a large screen (for example, TV and projector), high speed, wired interfaces such as HDMI and Display port are getting more and more popular.

However, in case a portable device is operated for a long time, a continuous, external power supply is needed for optimized operation thereof, and to this purpose, an external power cable should always be connected to the device. Since a wired interface does not support a power supply function, there is an inconvenience of having to use separate devices for external power and a wired interface in order to use a device intended for connecting a power cable. Therefore, there needs a method for supplying power through a wired interface without involving a separate, external device.

Technical Solution

To solve the technical problem above, a method for transmitting and receiving data of a source device receiving power through HDMI (High Definition Media Interface) according to the present invention comprises transmitting a request for reading out EDID (Extended Display Identification Data) to a sink device when the sink device is connected; receiving from the sink device EDID including power delivery support information of the sink device; transmitting required power characteristic information of the source device; and receiving power according to the required power characteristic information.

Also, in a method for transmitting and receiving data of a source device according to the present invention, the power delivery support information includes at least one of delivery support information indicating whether the sink device supports power delivery and support power characteristic information indicating power that the sink device supports, wherein the power delivery support information can be received in the form of HF-VSDB (HDMI Forum-Vendor Specific Data Block).

Also, in a method for transmitting and receiving data of a source device according to the present invention, required power characteristic information of the source device represents power that the source device supports, and the transmitting required power characteristic information of the source device can further comprise transmitting a message that writes the required power characteristic information into SCDCS (Status and Control Data Channel Structure) of the sink device.

Also, a method for transmitting and receiving data of a source device according to the present invention can further comprise activating a power delivery function of the sink device, and the activating a power delivery function of the sink device can further comprise transmitting a message that writes power delivery activation information included in the SCDCS (Status and Control Data Channel Structure) included in the sink device.

Also, to solve the technical problem above, a source device receiving power using HDMI according to the present invention comprises an HDMI transmitter transmitting and receiving data through HDMI; a power managing unit controlling reception of power through the HDMI; and a control unit controlling the HDMI transmitter and the power managing unit, wherein the source device transmits a request for reading out EDID (Extended Display Identification Data) to a sink device when the sink device is connected, receives from the sink device EDID including power delivery support information of the sink device, transmits required power characteristic information of the source device, and receives power according to the required power characteristic information.

Also, to solve the technical problem above, a method for transmitting and receiving data of a sink device transmitting power using HDMI (High Definition Media Interface) according to the present invention comprises receiving a request for reading out EDID (Extended Display Identification Data) from a connected source device; transmitting to the sink device EDID including power delivery support information of the sink device; receiving required power characteristic information of the source device; and transmitting power according to the required power characteristic information.

Also, in a method for transmitting and receiving data of a sink device according to the present invention, the power delivery support information includes at least one of delivery support information indicating whether the sink device supports power delivery or support power characteristic information indicating power that the sink device supports, wherein the power delivery support information can be transmitted in the form of HF-VSDB (HDMI Forum-Vendor Specific Data Block).

Also, in a method for transmitting and receiving data of a sink device according to the present invention, required power characteristic information of the source device represents power that the source device supports, and the receiving required power characteristic information of the source device can further comprise receiving a message that writes the required power characteristic information into SCDCS (Status and Control Data Channel Structure) of the sink device.

Also, a method for transmitting and receiving data of a sink device according to the present invention can further comprise activating a power delivery function of the sink device, and the activating a power delivery function of the sink device can further comprise receiving a message that writes power delivery activation information included in the SCDCS (Status and Control Data Channel Structure) of the sink device.

Also, to solve the technical problem above, a sink device receiving compressed video data using HDMI (High Definition Media Interface) comprises an HDMI receiver transmitting and receiving data through HDMI; a power managing unit controlling reception of power through the HDMI; and a control unit controlling the HDMI receiver and the power managing unit, wherein the sink device receives a request for reading out EDID (Extended Display Identification Data) from a connected source device, transmits to the source device EDID including power delivery support information of the sink device, receives required power characteristic information of the source device, and transmits power according to the required power characteristic information.

Advantageous Effect

According to the present invention, power can be transmitted and received between a source device and a sink device, and therefore power can be supplied to the source device without a separate cable connection.

Also, according to the present invention, since a source device can know through EDID information whether a sink device is capable of delivering power, the source device can receive power according to the type of sink device.

Also, according to the present invention, since information about power that a source device supports is transmitted, a sink device can transmit power at an appropriate level.

Also, according to the present invention, since a source device or a sink device matches its power information, power can be transmitted and received at an optimal level.

Also, according to the present invention, in case a source device needs to receive power, the power delivery function of a sink device can be activated/deactivated through SCDCS. Therefore, the source device can change configuration of the sink device depending on the needs even if the user does not change the specific configuration of the power delivery function of the sink device, thereby removing inconvenience imposed on the user.

DESCRIPTION OF DRAWINGS

FIG. 1 illustrates an HDMI system and data transmission and reception channels included in the HDMI system according to one embodiment of the present invention.

FIG. 2 illustrates a source device and a sink device in a HDMI system according to an embodiment of the present invention.

FIG. 3 illustrates an EDID structure according to an embodiment of the present invention.

FIGS. 4 to 5 illustrate an embodiment of an EDID extension block.

FIG. 6 illustrates an HF (HDMI Forum)-VSDB (Vendor-Specific Data Block) according to an embodiment of the present invention.

FIG. 7 illustrates an HF (HDMI Forum)-VSDB (Vendor-Specific InfoFrame) according to an embodiment of the present invention.

FIG. 8 illustrates an SCDC (Status and Control Data Channel) structure according to an embodiment of the present invention.

FIG. 9 illustrates a method for transmitting and receiving A/V data through HDMI according to an embodiment of the present invention.

FIG. 10 illustrates a method for transmitting and receiving power through HDMI according to an embodiment of the present invention.

FIG. 11 illustrates a method for power matching using an SCDC as a method for transmitting and receiving power through HDMI according to an embodiment of the present invention.

FIG. 12 illustrates a method for power matching using an SCDC as a method for transmitting and receiving power through HDMI according to an embodiment of the present invention.

FIG. 13 illustrates a method for transmitting and receiving power through HDMI according to an embodiment of the present invention.

FIG. 14 illustrates a method for transmitting information about matched power using an SCDC as a method for transmitting and receiving power through HDMI according to an embodiment of the present invention.

FIG. 15 illustrates a method for controlling power delivery of a sink device according to an embodiment of the present invention.

FIG. 16 illustrates a method for controlling power delivery using an SCDC as a method for controlling power delivery of a sink device according to an embodiment of the present invention.

FIG. 17 illustrates an HF-VSDB according to an embodiment of the present invention.

BEST MODE FOR INVENTION

In what follows, preferred embodiments of the present invention will be described in detail with reference to appended drawings. Detailed descriptions given below with reference to appended drawings are not limited only to those embodiments that can be realized according to the embodiments of the present invention, but they are intended to describe preferred embodiments of the present invention. The following descriptions include specific details to provide thorough understanding of the present invention. However, it should be clearly understood by those skilled in the art that the present invention can be implemented without employing the specific details.

Most terms used in this document are used widely in the corresponding technical field, but part of the terms have been chosen arbitrarily by the applicant, of which the meaning will be described in detail in the following description depending on the needs. Therefore, the present invention should be understood by the intended meaning of used terms rather than their apparent names or immediate implication.

In this document, field is a term used to indicate part of a data structure, which may also be called information.

FIG. 1 illustrates an HDMI system and data transmission and reception channels included in the HDMI system according to one embodiment of the present invention.

Devices that transmit and receive video/audio/control data using HDMI can be called collectively an HDMI system, and the HDMI system can comprise a source device 1010, a sink device 1020, and an HDMI cable. In the HDMI system, a device that transmits video/audio data through HDMI corresponds to the source device 1010, a device that receives video/audio data through HDMI corresponds to the sink device 1020, and an HDMI cable supporting data transmission and reception connects the two devices. However, it should be noted that a device receiving power may be called a source device 1010 while a device transmitting power may be called a sink device 1020.

As shown in FIG. 1, the HDMI cables and the connectors may perform pairing of four channels that provides a Transition Minimized Differential Signaling (TMDS) data channel and a TMDS clock channel. The TMDS data channels may be used for forwarding video data, audio data and auxiliary data.

Additionally, the HDMI system provides a VESA (Video Electronics Standards Association) DDC (Display Data Channel). The DDC is used for configuration of one source device and one sink device and exchange of status information between them. A CEC protocol can provide a high-level control function among various audio-visual products in a user environment and may be used optionally. Also, an optional HEAC (HDMI Ethernet and Audio Return Channel) may provide Ethernet-compatible data networking among an ARC (Audio Return Channel) and connected devices in the opposite direction from a TMDS.

Video data, audio data and supplementary data may be transmitted and received through three TDMS data channels. Commonly, a TMDS clock runs a video pixel rate, and is transmitted through a TMDS clock channel. The TMDS clock may be used as a reference frequency for data recovery in three TMDS data channels in an HDMI receiver. In a source device, the data of 8 bits per TMDS data channel may be transformed into a sequence of 10 bits of which transition is minimized, which is DC balanced, and transmitted in serial manner with a rate of 10 bits per TMDS clock period.

In order to transmit audio data and supplementary data through the TMDS channel, the HDMI uses a packet structure. In order to attain high reliability for audio data and control data, data may be transmitted in word of 10 bits which is generated by using a BCH error correction code and an error reduction coding.

The source device can figure out configuration information and available functions of the sink device by reading out E-EDID (Enhanced Extended Display Identification Data) of the sink device in the DDC (Display Data Channel). In what follows, the E-EDID may be called EDID information.

A utility line can be used for an optional extension function such as HEAC.

FIG. 2 illustrates a source device and a sink device in a HDMI system according to an embodiment of the present invention.

In the HDMI system, the device that transmits video/audio data through HDMI corresponds to the source device 2100, and the device that receives video/audio data through HDMI corresponds to the sink device 2200.

The source device 2100 can include at least one of a display unit 2110, user input interface unit 2120, power control unit 2130 (video encoder), control unit 2140, HDMI transmitter 2150, memory unit 2160, storage unit 2170, multimedia unit 2180, or power supply unit 2190. The sink device 2200 can include at least one of an EDID EEPROM 2210, power control unit 2220, display unit 2230, user input interface unit 2240, HDMI receiver 2250, control unit 2260, power supply unit 2270, memory unit 2280, or multimedia unit 2290. In what follows, descriptions about units performing the same operation will not be repeated.

The source device 2100 represents a physical device transmitting or streaming contents stored in the storage unit to the sink device 2200. The source device 2100 can send a request message to the sink device; or receive and process a request message from the sink device. Also, the source device 2100 can provide an UI through which a response message that the sink device 2200 transmits with respect to a transmitted request message is processed and delivered to the user, and in case the source device 2100 includes the display unit 2110, the UI can be displayed.

The sink device 2200 can receive contents from the source device 2100, transmit a request message to the source device 2100, or transmit a response message by processing a message received from the source device 2100. The sink device 2200 can also provide an UI through which a response message received from the source device 2100 is processed and delivered to the user, and in case the sink device 2200 includes the display unit 2230, the UI can be displayed.

The source device 2100 and the sink device 2200 can include a user input interface unit 2120, 2240 that receives the user's action or input, and as an example, the user input interface 2120, 2240 can correspond to a remote controller, voice reception/recognition device, or touch input sensing/receiving device.

The control unit 2140 of the source device and the control unit 2260 of the sink device can control operation of other units of the respective devices, and in particular, the control unit according to the present invention can control miscellaneous operation related to power transmission/reception through HDMI.

The memory unit 2160, 2280 represents a volatile physical device in which various types of data are stored temporarily.

The storage unit 2170 represents a nonvolatile physical device in which various types of data can be stored.

The EDID EEPROM 2210 represents an EEPROM that stores EDID information.

The aforementioned memory unit, storage unit, and EDID EEPROM all perform the function of storing data, which may be called collectively a memory unit.

The display unit 2110, 2230 displays data received through HDMI, data stored in a content storage, or UI on a screen according to the control of the control unit.

The multimedia unit 2180, 2290 plays various types of multimedia contents. The multimedia unit 2180, 2290 may be implemented independently of the control unit 2140, 2260 or implemented as one physical component together with the control unit.

The power supply unit 2190, 2270 supplies power required for operating a source device, sink device, and sub-units belonging to the source and sink devices. Although not shown in FIG. 2, the power supply unit may be connected to an HDMI cable and an HDMI transceiver.

The HDMI transmitter 2150 is the unit that is installed in the source device 2100 and transmits and receives data through HDMI. The HDMI transmitter 2150 transmits and receives data including a command between devices and a request, action, or response message as well as audio/video data.

The power managing unit 2130 at the source device-side controls reception of power through HDMI. The power managing unit 2130 may initiate/stop reception of power according to the control of the control unit 2140.

The HDMI receiver 2250 is the unit that is installed in the sink device 2200 and transmits and receives data through HDMI. The HDMI receiver 2250 transmits and receives data including a command between devices and a request, action, or response message as well as audio/video data.

The power managing unit 2220 at the sink device-side controls power transmission through HDMI. The power managing unit 2220 may initiate/stop power transmission according to the control of the control unit 2160.

In what follows, channels, data structure, and functions provided by the HDMI will be described in more detail.

As described above, the HDMI system provides a DDC (Display Data Channel), which is a protocol standard defined by the VESA (Video Electronics Standard Association) specifying transmission of digital information between the monitor and the computer graphic adaptor. HDMI devices can transmit information about display modes supported by the monitor to the graphic adaptor through the DDC, and the graphic adaptor can transmit images to the monitor according to the information. Before the DDC standard is approved, the VGA standard defined four pins (Pin 11, 12, 4, and 15) of an analog VGA connector for the purpose of recognizing monitor types; among the four pins, only the pin 11, 12, and 4 have been actually used, and 7 types of monitor types could be recognized. The following provide DDC specifications for the respective versions.

\*\*DDC version 1 (approved in 1994)
EDID (Extended Display Identification Data) is defined, which is a binary file format specifying monitoring information.
Pin 12 is used as a data line, and an EDID block of 128 byte is transmitted consecutively from a monitor to a computer.

\*\*DDC version 2 (approved in 1996)
EDID is no longer defined by the DDC, but specified separately as a companion standard.
DDC version 2 is based on I2C serial bus. Pin 12 is now used as the data line, and pin 15 is used as the clock line of I2C bus.

Pin 9 is used to supply 5V DC power (up to 50 mA) from the computer to the monitor to read the EDID stored in the EEPROM even if the monitor is powered off.

DDC version 2 uses an 8 bit data offset and supports the EDID storage capacity ranging from 28 bytes to 256 bytes.

\*\*E-DDC
E-DDC replaces the DDC version 1 and 2, and version 1 was introduced in 1999. To use E-EDID (Enhanced EDID), the E-DDC allows up to 32 Kbytes of display information storage capacity.
By employing a new I2C addressing scheme based on 8-bit segment index (0x00~0x7F), 128 segments (1 segment=256 bytes) can be accessed, by which up to 32 bytes can be accessed.
E-DDC version 1.1 was approved in 2004, which supports a video interface such as HDMI in addition to CE devices and VGA.
E-DDC version 1.2 was approved in 2007, which supports display port and display ID In what follows, EDID provided through the DDC will be described.

FIG. 3 illustrates an EDID structure according to an embodiment of the present invention.

EDID is a data structure containing various types of information about the display device defined in the VESA and can be transmitted to the source device through the DDC channel or read by the source device. In the case of EDID, the data structure of version 1.3 has been used in the IT display device, CE display device, and video interface (HDMI).

FIG. 3 shows an overview of the information represented by the respective addresses in the EDID data structure.

FIGS. 4 to 5 illustrate an embodiment of an EDID extension block.

FIG. 4 illustrates an EDID extension block, FIG. 5(*a*) a video data block, FIG. 5(*b*) an audio data block, and FIG. 5(*c*) a speaker allocation data block.

Timing information specified in the EDID is intended for IT display devices and can use the EDID 1.3 extension block defined in the CEA-861 to represent the timing information of CE display devices. The version 3 CEA extension block is defined in the CEA-861B standard and specifies four optional data blocks (video, audio, speaker allocation, and vendor-specific data block).

In the video data block of FIG. 5(*a*), the short video descriptor represents the video identification code defined in the CEA-861. In the audio data block of FIG. 5(*b*), the short audio descriptor represents the audio format code defined in the CEA-861. In the speaker allocation data block of FIG. 5(*c*), the speaker allocation data block descriptor represents the data block payload defined in the CEA-861.

FIG. 6 illustrates an HF (HDMI Forum)-VSDB (Vendor-Specific Data Block) according to an embodiment of the present invention.

The HF-VSDB shown in FIG. 6 is the data block that defines vendor-specific data, where HDMI can define HDMI-specific data by using the data block. The HF-VSDB can be included in the E-EDID of the sink device, and in that case, it can be positioned at CEA extension version 3 within the E-EDID of the sink device.

The fields included in the HF-VSDB of FIG. 6 are described as follows.

Length field: represents the total length of the data block, of which the minimum value is 7, and the maximum value is 31.

IEEE OUI field: refers to IEEE Organizationally Unique Identifier, and the OUI assigned to the HDMI forum is 0xC45DD8.

Version field: represents the version number of the HF-VSDB (HDMI Forum-VSDB), of which the value is 1.

Max_TMDS_Character_Rate field: represents the maximum TMDS character rate supported. If the sink device does not support the maximum TMDS character rate more than 340 Mcsc, it is set to 0; otherwise, it is set to 1.

3D_OSD_Disparity: when this field is set to 1, it indicates that the sink device supports reception of 3D_OSD_Disparity Indication.

Dual_view: when this field is set to 1, it indicates that the sink device supports reception of dual_view signaling.

Independent_view field: when this field is set to 1, it indicates that the sink device supports reception of 3D independent view signaling.

LTE_340Mcsc_scramble field: when this field is set to 1, it indicates that the sink device supports scrambling when the TMDS character rate is less than 340 Mcsc. And when the SCDC_Present is set to 0, this field also has to be set to 0.

RR_Capable field: when this field is set to 1, it indicates that the sink device can initiate an SCDC read request. And if the SCDC_Present is set to 0, this field also has to be set to 0.

SCDC_Present field: when this field is set to 1, it indicates that the sink device supports the SCDC function.

DC_48 bit_420, DC_36 bit_420, DC_30 bit_420: when these fields are set to 1, it indicates that deep color 4:2:0 pixel encoding is supported by 10 bit/12 bit/16 bit per component.

The present invention is capable of signaling power delivery support information of the sink device through an HF-VSDB of the EDID, which will be described later.

FIG. 7 illustrates an HF (HDMI Forum)-VSIF (Vendor-Specific InfoFrame) according to an embodiment of the present invention.

In FIG. 7, FIG. 7(*a*) shows the HF-VSIF packet header, FIG. 7(*b*) shows HF-VSIF packet contents, and they can form the infoframe together. The HF-VSIF is one of the infoframe, where the HF-VSIF packet is provided to support the feature(s) that requests ancillary information for fully identifying stream contents and can be transmitted from the source device to the sink device. As an example, the HF-VSIF may be defined for transmission of 3D video and 2160p video.

In what follows, described are the HF-VSIF packet header of FIG. 7(*a*) and fields included in the HF-VSIF packet contents of FIG. 7(*b*).

**HF-VSIF packet header
  Packet Type field: indicates payload type and is identified as 0x81 in the HF-VSIF.
  Version field: indicates the version number of the HF-VSIF and has a value of 1.
  Length field: indicates the length of the payload.
  **HF-VSIF packet contents
  3D_Valid field: indicates that transmission of 3D video data is in progress. If this field is set to 1, the 3D_F_Structure, 3D_Addiotional_Info_Present, 3D_Meta_Present, and 3D_F_Ext_Data field should be activated.
  3D_F_Structure field: indicates the transmission format of 3D video data (side-by-side, top-and-bottom, and so on).
  3D_Additional_Infor_Present field: this field is set to 1 when 3D_DualView, 3D_ViewDependency, and 3D_Preferred2DView information are added.
  3D_Disparity_Data_Present field: this filed is set to 1 when 3D disparity data are present.
  3D_Meta_Present field: this field is set to 1 when 3D metadata are present.
  3D_F_Ext_Data field: indicates a sub-sampling method according to the transmission format of 3D video data.
  3D_Dual_View field: this field is set to 1 when 3D dual views are available.
  3D_ViewDependency field: describes dependency of the right view or left view with respect to a coded view.
  3D_Preferred2DView field: indicates which of the right 3D view and the left 3D view is more appropriate for 2D view.
  3D_DisparityData_Version field: indicates the version of 3D disparity data.
  3D_DisparityData_length field: indicates the length of 3D disparity data.
  3D_DisparityData_1~3D_DisparityData_J field: describe the 3D disparity data.
  3D_MetaData_type field: indicates the type of 3D metadata.
  3D_MetaData_length field: indicates the length of 3D metadata.
  3D_Metadata_1~3D_Metadata_K field: describe 3D metadata.

FIG. 8 illustrates an SCDC (Status and Control Data Channel) structure according to an embodiment of the present invention.

The SCDC (Status and Control Data Channel) corresponds to a point-to-point communication protocol based on which the source device and the sink device exchange data with each other. The SCDC communication can use the aforementioned DDC channel (I2C line). In other words, the SCDC is a one-to-one communication protocol based on the I2C serial communication that enables HDMI source devices and sink devices to exchange data among them. The SCDC includes a mechanism in which the sink device, an I2C slave, requests status check read from the source device, an I2C master, and the source device receiving the request reads the corresponding status from the sink device.

The SCDCS (SCDC Structure) can be stored in the memory of the sink device and include data having the structure as shown in FIG. 8. In FIG. 8, R/W indicates whether the source device can only read or read/write the SCDCS data stored in the sink device.

The fields included in the SCDCS of FIG. 8 are described below.

Sink Version field: provides version information of an SCDCS compliant sink device.
  Source Version field: when the SCDCS compliant sink device reads E-EDID from the sink device, and the SCDC_Present of the E-EDID is set to 1, the source version of the SCDCS is set to 1.
  Update Flags (Update_0, Update_1) field: when there is a change in the information that the sink device has to inform of the source device (Status, Character Error Detect, and so on), the corresponding bit is set to 1.
  TMDS Configuration (TMDS_Config) field: each of the TMDS_Bit_Clock_Ratio and Scrambling_Enable occupies one bit, and if the source device attempts to activate the scrambling function of the sink device, the corresponding bit is set to 1. If the TMDS_Bit_Clock_Ratio is 1/10, this field is set to 0 while it is set to 1 in the case of 1/40.
  Scrambler Status field: when the sink device detects a scrambled control code sequence, the corresponding bit is set to 1.
  Configuration (Config_0) field: this field is used to configure capability-related information of the source and the sink device. Currently, this field provides only the RR_Enable field that indicates whether the source device supports a read request of the sink device.
  Status Flags (Status_Flag_0, Status_Flag_1) field: indicates whether data received through the clock, channel 0, 1, and 2 have been decoded successfully.
  Err_Det_0~2_L/H field: represent the LSB and MSB of the error counter detected in the channel 0 to 3.
  Err_Det_Checksum field: is implemented so that one byte sum of error detection values of seven registers including checksum becomes 0.

FIG. 9 illustrates a method for transmitting and receiving A/V data through HDMI according to an embodiment of the present invention.

FIG. 9 illustrates an embodiment in which the source device transmits uncompressed A/V data (at least one of audio data or video data) to the sink device.

First, the source device and the sink device are connected to each other through an HDMI cable S9000. If the HDMI cable is connected, the source device changes the 5V power line from the low level to the high level and applies currents S9010. By doing so, the source device can operate the EEPROM and related circuit in which the EDID information of the sink device is stored. By changing the HPD (Hot Plug Detect) line from the low level to the high level S9020, the sink device can inform the source device that the cable has been connected normally, the EDID-related circuit has been activated, and thus the EDID information can be accessed.

Now, the source device can transmit the EDID information read request to the sink device through the DDC S9030. In response to the EDID read request of the source device, the sink device can transmit the EDID information stored in the EEPROM through the DDC S9040. In the embodiment of the present invention, the EDID information can be transmitted as the aforementioned HF-VSDB.

The sink device can determine operation parameters (timing, format, and so on) for the A/V data to be transmitted to the sink device by parsing the received EDID information S9050 and transmit to the source device determined operation parameters related to the uncompressed A/V data to be transmitted S9060. In the embodiment of the present invention, the operation parameters may be transmitted as the HF-VSIF.

Finally, the source device can transmit uncompressed A/V data controlled by the determined operation parameters to the sink device S9070.

FIG. 9 illustrates a method for transmitting A/V data. However, it should be noted that in case the sink device is capable of providing power for charging/driving to the source device, the sink device has to inform the source device of power delivery support information and power characteristic information that can be provided. Also, the source device has to request power characteristic information required for the sink device on the basis of the aforementioned information and receive power accordingly. Also, in case charging is completed, the source device may have to control the power delivery function of the sink device. In what follows, a method for transmitting and receiving power through HDMI will be described in more detail.

FIG. 10 illustrates a method for transmitting and receiving power through HDMI according to an embodiment of the present invention. In particular, FIG. 10 illustrates a method for the sink device to determine whether to support power delivery.

First, steps from S10000 to S10030 are performed in the same way as the steps from S9010 to S9030 of FIG. 9, and thus descriptions thereof will not be repeated. FIG. 10 includes the operations additional to the diagram of FIG. 9; therefore, the same descriptions as given with respect to FIG. 9 can still be applied for the descriptions of FIG. 10 even if they are not repeated in the diagram of FIG. 10.

In FIG. 10, the sink device which has received a request for reading EDID information can transmit the EDID information including power delivery support information to the source device through the DDC S10040. The transmitted power delivery support information can include information about whether the sink device supports power delivery and about which capacity of power delivery the sink device supports. In other words, the power delivery support information can include the delivery support information indicating whether to support power delivery of the sink device and support power characteristic information indicating supported power. As described above, the EDID information may be read out from the EEPROM and be transmitted in the form of the HF-VSDB.

The source device can check whether the sink device supports power delivery by parsing the received EDID information S10050. And in case the sink device supports power delivery, the source device can arrange power delivery by transmitting power delivery request information S10060.

The power delivery request information can include required power characteristic information of the source device. The required power characteristic information can represent power level or amount of power that the source device has to receiver/can receive, and transmission of the required power characteristic information itself may indicate that the source device can support reception of power. In this document, the required power characteristic information is denoted/described in units of volts (V), but it may be described in terms of a different unit (W) according to embodiments.

The sink device can determine whether power can be transmitted by comparing power characteristic information received from the source device with the supported power characteristic information that the sink device supports; and matching the power characteristic information and the supported power characteristic information S10070. The sink device can transmit information about whether power can be transmitted according to matching of power information and matched power characteristic information to the source device in response to an arrangement request S10080. In case power can be transmitted, the sink device can initiate power transmission/delivery S10090. The sink device can transmit power at a power level obtained from matching of the received required power characteristic information and the supported power characteristic information of the sink device.

FIG. 11 illustrates a method for power matching using an SCDC as a method for transmitting and receiving power through HDMI according to an embodiment of the present invention.

FIG. 11 describes a method for performing the S10060 step of FIG. 10 by using the SCDC with more details, and the same descriptions about different steps of FIGS. 10 and 11 will not be repeated.

In the S10060 step of FIG. 10, the source device transmits power delivery request information that the source device has to receive to the sink device to arrange power delivery. The power delivery request information includes required power characteristic information of the source device. The power delivery request information/required power characteristic information can be transmitted by using the SCDC. To this purpose, the present invention implements power delivery configuration registers in the SCDCS. The power delivery configuration register may also be called the power request register. And the power delivery request information is implemented as an SCDC writing message that includes the required power characteristic information.

The source device can transmit the SCDC writing message used to configure the SCDC of the sink device with required power S11060. An embodiment of the SCDC writing message for configuration of the required power characteristic information is shown in FIG. 11(a), and the message corresponds to the power delivery request information of FIG. 10.

The SCDC writing message for configuring the required power characteristic information of FIG. 11(a), namely the power delivery request message can include an offset field (Sub-Address=power request register offset) representing the position of the power delivery configuration register in the SCDCS and a data field (Data=Required Voltage; required power characteristic information) representing required voltage. In other words, the power delivery request message can include offset information and required power characteristic information (in units of volts) of the power delivery configuration register. The sink device receiving the message can write the power delivery request information having the same content as the message in the power delivery configuration register.

FIG. 11(b) illustrates an embodiment of the power delivery configuration register, where a reserved offset (Reserved for Configuration (0x31-0x3F) or Reserved (All remaining Offsets)) of the SCDCS can be assigned as an offset of the power delivery configuration register. The required voltage characteristic information can express the power level that the source device wants to receive in terms of a voltage level. In the embodiment of FIG. 11(b), bits 0 to 4 are allocated to 3.3V, 5V, 9V, 12V, or vendor-defined field to represent the power level. If the bit of the field corresponding to the power level that the source device has requested is set to 1, or the requested power level is not found in the register, the bit of the vendor-defined field is set to 1 so that the required voltage can be represented additionally in a vendor-defined voltage register.

FIG. 11(c) is an embodiment of a vendor-defined voltage register, where a reserved offset (Reserved for Configuration (0x31-0x3F) or Reserved (All remaining Offsets)) of the SCDCS can be assigned as an offset of the vendor-defined voltage register. In the vendor-defined voltage register, a plurality of bits can be allocated to express other voltages (vendor-specific voltages) that are not expressed by 1 bit in the power delivery configuration register. In the embodiment of FIG. 11(c), bits 0 to 7 are allocated, bits 7 to 3 of which can be allocated to represent voltage up to 12 V with a resolution of 1 V, and bits 2 to 0 of which can be allocated to represent voltage with a resolution of 0.2 V. For example, for the bits 7 to 3, 0001 denotes 1 V, and 0010 denotes 2 V while 000 denotes 0.0 V, 001 denotes 0.2 V, and 010 denotes 0.4 V for the bits 2 to 0.

In other words, the source device can transmit to the sink device the power delivery request information, which is an SCDC writing message that includes required power characteristic information. Through the message, the source device can write the power that can be received in the SCDC register of the sink device in units of volts. And the sink device can match the required power characteristic information and the support power characteristic information of the sink device; and transmit power at one of matching power levels. In case there are multiple matching power levels, the highest power may be transmitted for the purpose of efficiency, or intermediate or low power may be transmitted to secure reliability, which can be determined by a predetermined setting of the control unit.

FIG. 12 illustrates a method for power matching using an SCDC as a method for transmitting and receiving power through HDMI according to an embodiment of the present invention.

FIG. 12 describes the method for performing the S10080 step of FIG. 10 by using the SCDC in more detail, and the same descriptions about other steps of FIGS. 10 and 11 will not be repeated.

In the S10080 step of FIG. 10, the sink device transmits a response with respect to power delivery arrangement to the source device. The transmission can be performed by using the SCDC, which will be described later. To this purpose, the present invention implements power ready information in the status flag register of the SCDCS. And the response to the power delivery request information is implemented in the form of an SCDC read message.

By transmitting an SCDC update read message S12080-1 and transmitting an SCDC status read message S12080-2, the sink device can inform the source device of update of the power ready information and enable the source device to read the power ready information. The power ready information can be set as one field in the status flag register and may be implemented by one bit.

FIG. 12(a) is an embodiment of the status flag register. The status flag register can include power_ready field. As an example, the power ready information can be positioned at the offset 0x41 of the SCDCS. The power ready information can indicate whether the power that the source device has requested can be supplied. The sink device compares the required power characteristic information received from the source device with the support power characteristic information of the sink device S12070. In case the sink device is capable of supporting the power that the source device requires, the sink device sets the power ready field to 1 so that the source device can prepare to receive power by reading the power ready field.

In case the sink device supports transmission of power that the source device has requested, the sink device can set the power ready field included in the status flag register to 1. And the sink device has to inform the source device that the power ready field has been set to 1, and to this purpose, can transmit two message-update read message and status read message to the source device S12080-1, S12080-2.

FIG. 12(b) illustrates an SCDC update read message. This message includes the address of the sink device (Slv Addr=0x54) and update information (Update_0 and Update_1). By transmitting the update read message to the source device, the sink device can inform that the SCDCS of the sink device has been updated.

FIG. 12(c) illustrates an SCDC read message. This message can include address information of the sink device (Slg Addr=0x54), register value of the information to be read (0x41), and information about the data to read (Data=0x04, 0x02, or 0x01). By transmitting the status read message, the sink device can inform the source device of an updated status field. According to the status read message, the source device can read out power ready information by reading out the value of the status register (status_1 register) separated by 0x41 from the slave address of the sink device, which is 0x54.

The source device can recognize the update of the SCDCS through the SCDC update read message and read out power ready information through the SCDC status read message. In case the power ready information is 1, the source device determines that the sink device is ready for transmission of power and prepares to/waits for receive power.

Finally, the sink device transmits power according to the matched power characteristic information S12090, and the source device receives power accordingly.

FIG. 13 illustrates a method for transmitting and receiving power through HDMI according to an embodiment of the present invention. In particular, different from the embodiment of FIG. 10, FIG. 13 illustrates a method used by the source device to determine whether it is possible to transmit power.

First, the steps from S13000 to S13030 are performed in the same way as the steps from S9010 to S9030 of FIG. 9, description of which thus will not be repeated afterwards.

FIG. 13 includes the operations added to the diagram of FIG. 9, and the same descriptions that have been given with respect to FIG. 9 can be applied to illustrate FIG. 13 even if they are not repeated with respect to FIG. 13.

In FIG. 13, the sink device that has received an EDID information read request can transmit EDID information that includes power delivery support information to the source device through the DDC S13040. The power delivery support information transmitted can include information about whether the sink device supports power delivery and which amount of power delivery the sink device supports. In other words, the power delivery support information can include delivery support information indicating whether the sink device supports power delivery and support power characteristic information indicating the power that can be delivered. As described in detail above, the EDID information may be read out from the EEPROM and transmitted as an HF-VSDB.

The source device can parse the received EDID information and check whether the sink device supports power delivery S13050. The source device can check whether the sink device is capable of delivering power and at which level the sink device can transmit power.

In case the sink device supports power delivery, the source device can match power characteristic information S13060. The power characteristic information can indicate the power level at which the source device has to receive/can receive power, and transmission of the power information itself may indicate that the source device supports reception of power. The source device can compare the support power characteristic information of the sink device with the required power characteristic information of the source device; match the support power characteristic information and the required power characteristic information; and transmit matched power characteristic information to the sink device S13070. In this document, the matched power characteristic information can be called matched power capability information.

The matched power characteristic information can include information about the power at a matched level obtained from the required power characteristic information that the source device supports and the support power characteristic information that the sink device supports. For example, if the required power characteristic information of the source device includes 5V and 9V, and the support power characteristic information of the sink device includes 9V and 12V, matched power characteristic information includes 9V. However, since the matched power characteristic information is also transmitted from the source device and corresponds to one of power levels included in the required power characteristic information of the source device, the matched power characteristic information in this document may be called required power characteristic information. This is so because the matched power characteristic information also corresponds to the power characteristic information that the source device requires to receive. However, in case the source device performs power characteristic matching, this may be referred to as the matched power characteristic information depending on the needs.

The sink device can initiate power transmission/delivery on the basis of the received, matched power characteristic information S13080.

FIG. 14 illustrates a method for transmitting and receiving power through HDMI according to an embodiment of the present invention and more specifically, a method for transmitting information about matched power using the SCDC.

FIG. 14 provides a more detailed description about a method for performing the S13060 step of FIG. 13 by using the SCDC, and the same descriptions about other steps of FIGS. 10 and 13 will not be repeated.

In the S14060 step of FIG. 14, the source device transmits matched power characteristic information to the sink device to receive appropriate power. This step can be performed by using the SCDC, which will be described below. To this purpose, the present invention implements power delivery configuration registers in the SCDCS. The power delivery configuration register may also be called a power request register. And the matched power characteristic information is implemented as an SCDC writing message.

The source device can transmit the SCDC writing message to configure matched power in the SCDC of the sink device S14070. FIG. 14(a) shows an embodiment of the SCDC writing message for configuring power information, and this message corresponds to the matched power characteristic information of FIG. 13.

The SCDC writing message of FIG. 14(a) for configuring power characteristic information, namely the matched power delivery request message can include an offset field (Sub-Address=power request register offset) representing the position of the power delivery configuration register in the SCDCS and a data field (Data=Required Voltage; matched power information) representing the matched power level. In other words, the power delivery request message can include offset information and matched power characteristic information (in units of volts) of the power delivery configuration register. The sink device receiving this message writes the power delivery request FIG. 14(b) is an embodiment of the power delivery configuration register, where a reserved offset (Reserved for Configuration (0x31-0x3F) or Reserved (All remaining Offsets)) of the SCDCS can be assigned as an offset of the vendor-defined voltage register. The matched voltage characteristic information can express the power level that the source device wants to receive in terms of a voltage level. In the embodiment of FIG. 11(b), bits 0 to 4 are allocated to 3.3V, 5V, 9V, 12V, or vendor-defined field to represent the power level. The bit of the field corresponding to the power level that the source device has requested is set to 1, or if the requested power level is not found in the register, the bit of the vendor-defined field is set to 1 so that the required voltage can be represented additionally in a vendor-defined voltage register.

FIG. 14(c) is an embodiment of a vendor-defined voltage register, where a reserved offset (Reserved for Configuration (0x31-0x3F) or Reserved (All remaining Offsets)) of the SCDCS can be assigned as an offset of the vendor-defined voltage register. In the vendor-defined voltage register, a plurality of bits can be allocated to express other voltages (vendor-specific voltages) that are not expressed by 1 bit in the power delivery configuration register. In the embodiment of FIG. 11(c), bits 0 to 7 are allocated, bits 7 to 3 of which can be allocated to represent voltage up to 12 V with a resolution of 1 V, and bits 2 to 0 of which can be allocated to represent voltage with a resolution of 0.2 V. For example, for the bits 7 to 3, 0001 denotes 1 V, and 0010 denotes 2 V while 000 denotes 0.0 V, 001 denotes 0.2 V, and 010 denotes 0.4 V for the bits 2 to 0.

As shown in FIG. 14, if the source device writes the matched power characteristic information in the SCDCS of the sink device, the sink device can transmit power according to the power information written in the SCDCS S14080.

In what follows, a method for the source device to control power delivery of the sink device will be described.

FIG. 15 illustrates a method for controlling power delivery of a sink device according to an embodiment of the present invention.

FIG. 15 assumes a situation in which the source device and the sink device are connected to each other by an HDMI cable, and power delivery is possible but is not being performed at the moment.

The source device can detect the needs for power delivery S15010. The source device can detect such a situation where the amount of battery charge of the source device goes below a threshold, which can correspond to the situation requiring power supply or recharging. Therefore, in this case, the source device can request the sink device to activate a power delivery function S15020.

The sink device S15030 can activate the power delivery function according to the request of the source device. And the source device can arrange power delivery by transmitting power delivery request information or transmit matched power information S15040. This step can be embodied by performing at least one of the S10060 step of FIG. 10 or the S13070 step of FIG. 13. And the sink device can deliver power to the source device according to the matched power information S15050.

And the source device can detect the situation where power delivery is not needed S15060. The source device detects such a situation where the amount of battery charge of the source device goes above a threshold or a power cable is connected thereto, which can correspond to the situation requiring no further power delivery. Therefore, in this case, the source device can request the sink device to deactivate the power delivery function S15070.

The sink device can deactivate the power delivery function according to the request for the source device to deactivate the power delivery function S15080.

The request for activating the power delivery function S15020 and activation of the power delivery function S15030 of FIG. 15 may be performed to receive power in addition to the steps of FIGS. 10 to 14.

FIG. 16 illustrates a method for controlling power delivery using an SCDC as a method for controlling power delivery of a sink device according to an embodiment of the present invention.

FIG. 16 illustrates a method for activating the power delivery function through the SCDC in addition to the method of FIG. 15. To control the power delivery function, the present invention can set up the power delivery activation field/information in the configuration register included in the SCDCS.

As described in FIG. 15, the source device can transmit a request for activating the power delivery function. If the aforementioned operation is illustrated in FIG. 16 in terms of the SCDC, the source device can transmit an SCDC writing message that writes/sets the power delivery activation information.

FIG. 16(a) illustrates an SCDC writing message that sets a power delivery activation field according to an embodiment of the present invention. The writing message of FIG. 16(a) includes slave address information (Slv Addr=0x54), sub-address (offset) information (Sub-Address=0x30), and data (Data=Power Delivery Enable), where the data represents a power delivery activation field setting command. In other words, this message represents a request to set the power delivery activation field of the register (configuration register) at an offset 0x30 from the sink device, the slave address of which is 0x54, to 1.

As shown in FIG. 15, the sink device can activate the power delivery function according to a reception request. If the aforementioned operation is illustrated in FIG. 16 in terms of the SCDCS, the sink device can activate the power delivery function by setting the power delivery activation field included in the SCDCS to 1.

FIG. 16(b) illustrates the configuration register according to an embodiment of the present invention. In the present invention, one of the reserved bits of the configuration register can be allocated to the power delivery activation field (PD_Enable). If the power delivery activation field is set to 1, it indicates that the power delivery function is activated; if the power delivery activation field is set to 0, it indicates that the power delivery function is deactivated.

The sink device can control the power delivery function of the source device by transmitting an SCDC writing message that sets the value of the power delivery activation field (writes 1 to the field) to the source device. In other words, in case the sink device detects charge completion S16060, the sink device can transmit the SCDC writing message that deactivates power delivery S16070. The SCDC writing message can correspond to the message that requests to set the value of the power delivery activation field of the configuration register included in the SCDCS to 0. By resetting the power delivery activation information to 0 according to the message, the source device can deactivate the power delivery function S16080.

FIG. 17 illustrates an HF-VSDB according to an embodiment of the present invention.

The HF-VSDB of FIG. 17 can be transmitted as EDID information that includes the power delivery support information illustrated in the embodiments of FIGS. 11 and 13. In other words, by transmitting the HF-VSDB of FIG. 17 to the source device, the sink device can signal whether the sink device supports power delivery and supported power level. FIG. 17 defines a new HF-VSDB, and the version number field can be set to 2 so that the new HF-VSDB can be distinguished from an existing HF-VSDB. In FIG. 17, the HF-VSDB can include the delivery support information and support power characteristic information.

The delivery support information comprises one bit and can indicate whether the sink device supports power transmission. As an embodiment, the delivery support field can use one bit from among bits 5 to 4 of byte 6 or bits 7 to 3 of byte 7 of the HF-VSDB. If the delivery support field/ information is set to 1, it indicates that the sink device can supply power whereas, if the delivery support field/information is set to 0, it indicates that the sink device is unable to supply power.

The support power characteristic information indicates the power that can be provided in case the sink device supports power delivery. The power that the sink device can deliver can be specified in terms of power level or amount of power, and as described above, it can be represented in units of volts. As an embodiment, the power level that the sink device can support can be represented by configuring the corresponding bit of byte 8. For example, as shown in FIG. 17, the power level that the sink device supports can be represented by setting the 12V power level to bit 3 of the byte 8, 9V power level to bit 2, 5V power level to bit 1, and 3.3V power level to bit 0 respectively and by setting the bit of the corresponding power level to 1.

The power level value not set by 1 bit can be represented by vendor-defined information. As an embodiment, bit 4 of the byte 8 can be used to represent a vendor-defined power level, and byte 9 can be used to specify resolution of the vendor-defined power level. In case power level values other than 3.3V, 5V, 9V, and 12V are supported, bit 4 of the byte 8 can be set to 1, and the corresponding power level value can be represented by using the byte 9.

The present invention defines information about whether the sink device supports power delivery to the source device and related characteristic information and discloses a method for delivering the information to the source device; defines characteristic information of the power required by the source device and discloses a method for delivering the information to the sink device; and discloses a method for controlling operation of a power delivery function of the sink device.

1) Power supply between a source and a sink device, definition of characteristic information related to the power supply request, and a method for exchanging and configuring the characteristic information—power characteristic information matching in the sink device When the source device and the sink device are connected to each other, the sink device puts information about whether the sink device supports the power delivery function in the VSDB of the E-EDID and transmits the information to the source device through the DDC. The source device receiving and analyzing the information checks whether the sink device supports the power delivery function and if it is found that the sink device supports the power delivery function, transmits characteristic information of the power that the source device wants to receive to the sink device through the SCDC. The sink device, receiving the power characteristic information, matches the transmitted information and the power characteristic information that can be supported by the sink device and delivers the matching result to the source device through the SCDC. The characteristic information of the power that the sink device can support can be all specified in the SCDCS.

2) Power supply between a source and a sink device, definition of characteristic information related to the power supply request, and a method for exchanging and configuring the characteristic information—power characteristic information matching in the source device When the source device and the sink device are connected to each other, the sink device puts information about whether the sink device supports the power delivery function and characteristic information of the power that can be supported in the VSDB of the E-EDID and transmits the information to the source device through the DDC. The source device receiving and analyzing the information checks whether the sink device supports the power delivery function and if it is found that the sink device supports the power delivery function, matches characteristic information of the power that the source device wants to receive and characteristic information of the power that the sink device can support and informs the sink device of the matching result through the SCDC. The characteristic information of the power that the sink device can support can be all specified in the SCDCS.

3) Method for controlling operation of a power delivery function of the sink device Before the sink device supplies power to the source device, the source device can activate and deactivate the power delivery function of the sink device depending on device conditions. To this purpose, a bit indicating activation and deactivation of the power delivery function is defined in the SCDCS of the sink device. To describe controlling the defined bit, by setting the bit related to the power delivery function defined in the SCDCS of the sink device to 1 through the SCDC, the power delivery function can be activated. Similarly, while receiving power, the source device can deactivate the power delivery function by setting the bit related to the power delivery function defined in the SCDCS of the sink device through the SCDC to 0 according to device conditions.

It will be understood by those skilled in the art to which the present invention belongs that the present invention can be modified or changed in various ways without departing from the technical principles or scope of the present invention. Therefore, it is intended that the present invention includes modifications and changes of the present invention provided within the technical scope defined by appended claims and their equivalents.

In this document, the device and the method according to the present invention have been described fully, and descriptions for the device and method can be applied to each other in a complementary manner.

MODE FOR INVENTION

Various embodiments are described in Best mode for invention.

INDUSTRIAL APPLICABILITY

The present invention is used in a series of HDMI fields.

It is apparent to an ordinary skilled person in the art that various modifications and changes may be made without departing from the spirit and scope of the present invention. Accordingly, the present invention is intended to include the modifications and changes of the present invention within the attached claims and the equivalent scope.

The invention claimed is:

1. A method of a source device for receiving power using HDMI (High Definition Media Interface) comprising:
   connecting to a sink device using the HDMI;
   providing a high level on a +5V power line;
   detecting a high level on HPD (Hot Plug Detect) line;
   receiving from the sink device, EDID (Extended Display Identification Data) including power delivery support information of the sink device;
   transmitting required power characteristic information of the source device by transmitting a message that writes the required power characteristic information into SCDCS (Status and Control Data Channel Structure) of the sink device;
   wherein the required power characteristic information of the source device represents power that the source device requires, and
   receiving power according to the required power characteristic information.

2. The method of claim 1, wherein the power delivery support information includes at least one of delivery support information indicating whether the sink device supports power delivery and support power characteristic information indicating power that the sink device supports, and
   wherein the power delivery support information is received in the form of HF-VSDB (HDMI Forum-Vendor Specific Data Block).

3. The method of claim 1, further comprising activating a power delivery function of the sink device.

4. The method of claim 3, wherein the activating a power delivery function of the sink device further comprises transmitting a message that writes power delivery activation information included in the SCDCS included in the sink device.

5. In a source device receiving power using HDMI, the source device comprising:

an HDMI transmitter transmitting and receiving data through HDMI;
a power managing unit controlling reception of power through the HDMI; and
a control unit controlling the HDMI transmitter and the power managing unit,
wherein the source device:
connects to a sink device using the HDMI,
provides a high level on a +5V power line,
detects a high level on HPD (Hot Plug Detect) line,
receives from the sink device, EDID (Extended Display Identification Data) including power delivery support information of the sink device,
transmits required power characteristic information of the source device by transmitting a message that writes the required power characteristic information into SCDCS (Status and Control Data Channel Structure) of the sink device,
wherein the required power characteristic information of the source device represents power that the source device requires, and
receives power according to the required power characteristic information.

6. The source device of claim 5, wherein the power delivery support information includes at least one of delivery support information indicating whether the sink device supports power delivery and support power characteristic information indicating power that the sink device supports, and
wherein the power delivery support information is received in the form of HF-VSDB (HDMI Forum-Vendor Specific Data Block).

7. The source device of claim 5, wherein the source device activates a power delivery function of the sink device.

8. The source device of claim 7, wherein activation of a power delivery function of the sink device is performed by transmitting a message writing power delivery activation information included in the SCDCS included in the sink device.

9. A method of a sink device for transmitting power using HDMI (High Definition Media Interface), comprising:
connecting to a source device using the HDMI;
detecting a high level on a +5V power line;
providing a high level on HPD (Hot Plug Detect) line;
transmitting, to the source device, EDID (Extended Display Identification Data) including power delivery support information of the sink device;
receiving required power characteristic information of the source device by receiving a message that writes the required power characteristic information into SCDCS (Status and Control Data Channel Structure) of the sink device; and
wherein the required power characteristic information of the source device represents power that the source device requires, and
transmitting power according to the required power characteristic information.

10. The method of claim 9, wherein the power delivery support information includes at least one of delivery support information indicating whether the sink device supports power delivery or support power characteristic information indicating power that the sink device supports, and
wherein the power delivery support information is transmitted in the form of HF-VSDB (HDMI Forum-Vendor Specific Data Block).

11. The method of claim 9, further comprising activating a power delivery function of the sink device.

12. The method of claim 11, wherein the activating a power delivery function of the sink device further comprises receiving a message that writes power delivery activation information included in the SCDCS of the sink device.

13. In a sink device receiving compressed video data using HDMI (High Definition Media Interface), the sink device comprising:
an HDMI receiver transmitting and receiving data through HDMI;
a power managing unit controlling reception of power through the HDMI; and
a control unit controlling the HDMI receiver and the power managing unit,
wherein the sink device:
connects to a source device using the HDMI,
detects a high level on a +5V power line,
provides a high level on HPD (Hot Plug Detect) line,
transmits, to the source device, EDID (Extended Display Identification Data) including power delivery support information of the sink device,
receives required power characteristic information of the source device by receiving a message that writes the required power characteristic information into SCDCS (Status and Control Data Channel Structure) of the sink device,
wherein the required power characteristic information of the source device represents power that the source device requires, and
transmits power according to the required power characteristic information.

14. The sink device of claim 13, wherein the power delivery support information includes at least one of delivery support information indicating whether the sink device supports power delivery and support power characteristic information indicating power that the sink device supports, and
wherein the power delivery support information is received in the form of HF-VSDB (HDMI Forum-Vendor Specific Data Block).

15. The sink device of claim 13, wherein the sink device activates a power delivery function of the sink device.

16. The sink device of claim 15, wherein activation of a power delivery function of the sink device is performed by receiving a message writing power delivery activation information included in the SCDCS of the sink device.

* * * * *